(12) United States Patent
Odendahl et al.

(10) Patent No.: US 8,655,480 B1
(45) Date of Patent: Feb. 18, 2014

(54) AUTOMATED FILLER PRODUCTION METHOD

(75) Inventors: David Odendahl, Bothell, WA (US); Michael Parent, Greenbank, WA (US); Alan Glasscock, Freeland, WA (US); Craig Charlton, Snohomish, WA (US); Peter Bui, Lynwood, WA (US); Loren Fiske, Snohomish, WA (US); Danny Lee Beaman, Kent, WA (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 12/987,364

(22) Filed: Jan. 10, 2011

Related U.S. Application Data

(60) Provisional application No. 61/412,522, filed on Nov. 11, 2010.

(51) Int. Cl.
*G06F 19/00* (2011.01)
(52) U.S. Cl.
USPC .................................. 700/182; 451/259; 703/6
(58) Field of Classification Search
USPC ................. 700/182; 451/259; 703/6
See application file for complete search history.

(56) References Cited

U.S. PATENT DOCUMENTS

| | | | |
|---|---|---|---|
| 4,848,137 A | 7/1989 | Turner et al. | |
| 7,756,321 B2 | 7/2010 | Marsh et al. | |
| 2001/0046323 A1 | 11/2001 | Cork et al. | |
| 2003/0093187 A1* | 5/2003 | Walker | 701/1 |
| 2005/0278670 A1* | 12/2005 | Brooks et al. | 716/5 |
| 2006/0269368 A1 | 11/2006 | Skiles et al. | |
| 2006/0287783 A1* | 12/2006 | Walker | 701/29 |
| 2007/0175540 A1* | 8/2007 | Anderson et al. | 141/130 |
| 2008/0110275 A1 | 5/2008 | Odendahl | |
| 2008/0205763 A1 | 8/2008 | Marsh et al. | |
| 2009/0242760 A1* | 10/2009 | Miyamoto et al. | 250/307 |
| 2010/0003904 A1* | 1/2010 | Duescher | 451/259 |
| 2011/0062118 A1* | 3/2011 | Tricarico et al. | 219/69.15 |

* cited by examiner

*Primary Examiner* — Mohammad Ali
*Assistant Examiner* — Anthony Whittington
(74) *Attorney, Agent, or Firm* — Hanley, Flight & Zimmerman, LLC

(57) ABSTRACT

An automated filler production method includes obtaining gap measurement data by measuring a gap between component parts of a structure, delivering the gap measurement data to a data collector function, monitoring incoming filler requirements, updating solid model definitions of the filler, creating portable Machine Control Data (MCD) using the gap measurement data in the form of the updated solid model, delivering the MCD to a filler machining center and machining a filler from a filler substrate using the MCD, while providing status updates as the data progresses through the filler machining process.

11 Claims, 3 Drawing Sheets

AUTOMATED FILLER PRODUCTION METHOD

CROSS REFERENCE TO RELATED APPLICATIONS

This application claims the benefit of Provisional U.S. Patent Application No. 61/412,522 filed Nov. 11, 2010, which is incorporated by reference herein.

TECHNICAL FIELD

The disclosure generally relates to producing the shimming process where fillers are applied to assembly process of filling gaps in mechanical structures. There are two object classifications for filling gaps in structure, shims which are made from peelable laminated materials and fillers which are precisely machined form solid monolithic materials. More particularly, the disclosure relates to an automated process of defining, producing and tracking the status of custom fillers produced on demand for immediate installation on an inline flow production line when the full design definition of a structure resides in a CAD/CAM system.

BACKGROUND

In the fabrication of mechanical structures such as aircraft, it may be necessary to introduce fillers between interfacing surfaces of the component parts to assure proper and safe structure. Fillers (also known as shims) are pieces of metallic or non-metallic materials which are placed in gaps between the component parts to compensate for dimensional variations or tolerance buildup between the parts. In the aircraft industry, fillers may be used in fitting and joining major structural sections to one another and throughout substructures as they are built-up into a full aircraft structure. The use of fillers may compensate for dimensional variation between parts or bring parts into proper alignment.

A conventional method of defining and producing custom fillers may include measuring gaps between parts using feeler gauges, capacitive gap measuring instrumentation or computer/laser based scanning measurement systems. The gap measurement data may be documented and delivered via entry into a series of software capabilities which process the gap measurements, updated digital definitions of the fillers and generates portable Machine Control Data (MCD). The MCD is downloaded to a central server which delivers the MCD to a Computer Numerical Control (CNC) controlled machine tool. The CNC machine tool machines the filler using cutting tool configurations which are specific to the filler and its material being manufactured. Following the machining of the filler on its surface and profile, it is de-burred and the filler marked with its identification to facilitate its installation in the structure.

In previous applications, the conventional filler definition and elements of the production process may be paper-based. In some production schemes, however, the full design definition of the structure which is being fabricated may be digitally defined and electronically stored and processed in a CAD/CAM system such as CATIA V5 and Enovia. For large-scale production of aircraft, the design definition of an aircraft may be defined by engineers from many companies which design various sections of the aircraft. That digital definition establishes and maintains the full definition of all components in their spatial relationship—in aircraft coordinates. The fabricated aircraft sections undergo final assembly at an aircraft assembly plant.

In current aircraft production schemes, an automated process of defining, producing and tracking the status of custom fillers on demand for immediate installation on an inline flow production line when the full design definition of a structure resides in a CAD/CAM system is required.

SUMMARY

The disclosure is generally directed to an automated filler production method. The automated filler production method is suitable for defining, producing and tracking the status of custom fillers on demand for immediate installation on an inline flow production line when the full design definition of a structure resides in a CAD/CAM system. An illustrative embodiment of the method includes obtaining gap measurement data by measuring a gap between component parts of a structure, delivering the gap measurement data to a data collector function, updating the CAD solid model of the filler (in its relationship in the structure) using the gap measurement data, creating portable Machine Control Data (MCD) using the CAM function of the CADCAM system, delivering the MCD to a filler machining center via a networked server, and machining a filler from a metallic or non-metallic composite materials using the MCD.

In some embodiments, the automated filler production method may include obtaining gap measurement data by measuring a gap between component parts of a structure; capturing and delivering the gap measurement data to a data collector function; generating a new CAD solid model definition with the gap measurements, creating portable Machine Control Data (MCD) using the CAM function of the CADCAM system, delivering the MCD to a filler machining center via a networked server, and machining a filler from a metallic or non-metallic composite materials using the MCD.

The disclosure is further generally directed to a method of applying a diamond abrasive cutting tool configuration to the fabrication of fillers from large sheets of non-metallic composite material. An illustrative embodiment of the method includes providing a cutting tool including a tool shank, a tool head attached to the tool shank and individual diamond abrasive cutting edges attached to the tool head; providing a non-metallic composite filler materials; and machining a filler from the filler from larger sheets of material using the cutting tool.

The features, functions, and advantages that have been discussed can be achieved independently in various embodiments of the present disclosure or may be combined in yet other embodiments further details of which can be seen with reference to the following description and drawings.

BRIEF DESCRIPTION OF THE ILLUSTRATIONS

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the claims. Furthermore, there is no intention to be bound by any expressed or implied theory presented in the preceding technical field, background, brief summary or the following detailed description.

The disclosure is generally directed to an integrated automated filler production method from gap measurement, filler definition, NC (Numerical Control) programming, filler machining (regardless of the material type), delivery of fillers for the assembly of a structure such as a composite aircraft, and filler status tracking. The method may be embodied in software which enables integration of these processes and assures the quality of the finished filler. The disclosure is further generally directed to the configuration, features and method of application of a diamond abrasive cutting tool configuration which enables the unique gage reduction material removal capabilities of non-metallic composite materials (GFRP and CFRP). Additionally, the methods may enable the production of multiple metallic material fillers utilizing their unique required cutter configurations.

Figure 1:
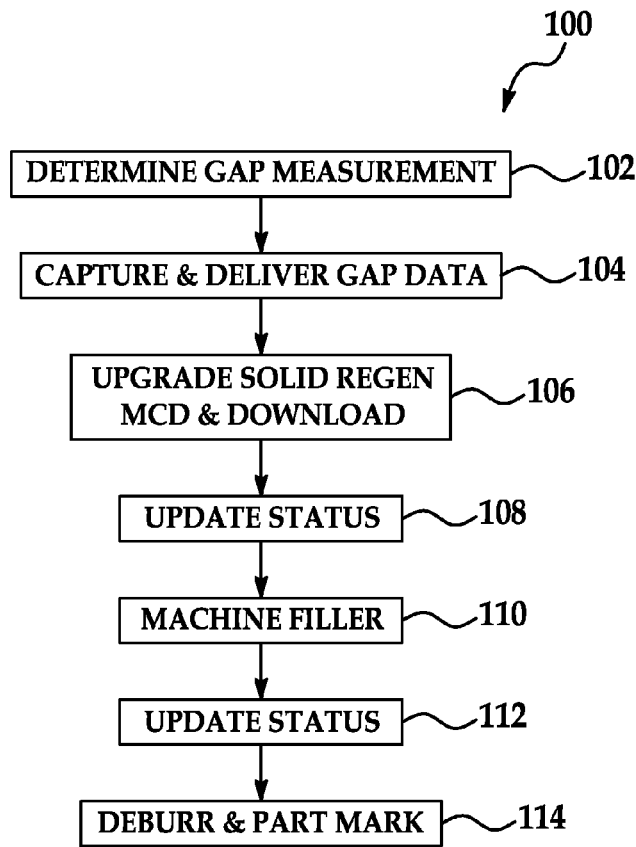
FIG. 1 is a flow diagram of an illustrative embodiment of the automated filler production method.

Referring initially to FIG. 1, a flow diagram 100 of an illustrative embodiment of the automated filler production method is shown. The method 100 may be implemented in the integration of fillers during the production of aircraft or other structures. In block 102, measurement of a gap between component parts of the aircraft or other structure may be made. The gap measurement may be made by multiple methods—mechanical, electrical, or computer based, for example and without limitation. The accuracy of the gap measurement capture is assured through a graphical user interface for the data collection function.

In block 104, the gap measurement data obtained in block 102 may be captured and delivered to a data collector function which is adapted to display and assess all measurement points and then to deliver the properly formatted measurement data to a proper server location. A "watcher" function transmit notifications to personnel who are responsible for supporting the filler machining process that new measurement data has arrived and if the gap measurements meet specified design criteria. Automated entry of the gap measurement data to the data collector function may be made via interfaces with the measurement equipment. The gap measurement data may be transmitted to the data collector function via a factory wireless network or via direct hardwired network connection. Upon receipt of the gap measurement file, an automatic population of a filler CAD definition with the measurement data may occur.

In block 106, a solid model of the structure, including the filler solid model, may be updated with the population of filler CAD definition carried out in block 104. An automated update of the NC (Numeric control) program for the machining process may be generated from the updated solid model and the creation of portable Machine Control Data (MCD) may be accomplished. An automated download of the MCD to a central server may be accomplished. In block 108, a status update to note availability of the MCD may be accomplished.

In block 110, a direct delivery of the MCD to a machining center may be generated such as by request from a machinist and the filler may be machined from a from a larger sheet of material. In some embodiments, the sheet of material from which the filler is machined may be a composite material in the form of Glass Fiber Re-enforced Plastic (GFRP) or Carbon Fiber Re-enforced Plastic (CFRP) or other non-metallic materials. In other embodiments, the material sheet from which the filler is machined may be metallic in nature. If necessary, machining of the filler may be shifted within the material sheet envelope to assure maximum material utilization. Highly-specialized cutting tool configurations may be utilized by the MCD to machine the complex filler surfaces. The filler may be machined from a material which may be of any type including composite non metallic, and metallic materials, for example and without limitation.

In block 112, changes in the status of the filler through out its fabrication process may be logged and reported as required. In block 114, deburring of the filler may be carried out and the filler may be marked for incorporation into the structure. The filler may be immediately installed on an inline flow production line or retained for future use depending on the production strategy.

It will be appreciated by those skilled in the art that the method of the disclosure may be implemented to define, produce, and ascertain and distribute the status of fillers that are custom-produced on demand for immediate installation on an inline flow production line in applications in which the full design requirement of an aircraft or other structure resides solely in a CAD/CAM system. It will be further appreciated by those skilled in the art that the method 100 may support 5-axis machine tools, 3D engineering definition of an aircraft or other structure, automatic capture of gap measurement data, automated delivery of the gap measurement data, machining of composite materials, automated generation of the Machine Control Data (MCD), delivery of the MCD to the machine tool and automated filler status collection, communication, and storage for future performance and process analysis.

Figure 1A:
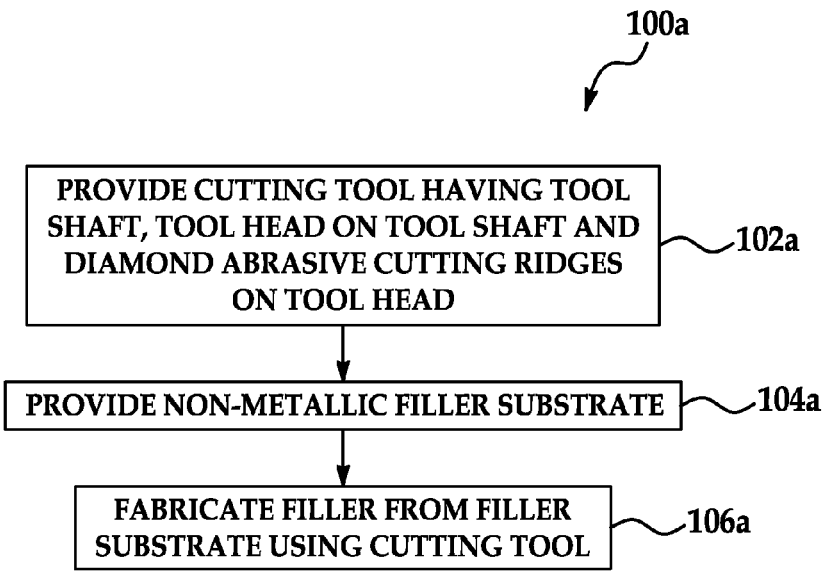
FIG. 1A is a flow diagram of an illustrative embodiment of a method of applying a diamond abrasive cutting tool configuration which enables unique gage reduction material removal capabilities for non-metallic composite materials.

Referring next to FIG. 1A, a flow diagram 100a of an illustrative embodiment of a method of applying a diamond abrasive cutting tool configuration which enables unique gage reduction and complex surface generation via material removal techniques of non-metallic composite materials is shown. In some applications, the flow diagram 100a may be implemented as part of block 110 of the flow diagram 100 which was heretofore described with respect to FIG. 1. In block 102a, a cutting tool having a tool shank, an attached material removal cutting head on the tool shank and diamond abrasive cutting material applied on all material removal surfaces including grooves formed to facilitate the material removal process is provided. The cutting tool may have one of the cutting tool configurations which are described with respect to FIGS. 2-5A herein below. In block 104a, a non-metallic filler material sheet is provided. In some embodiments, the non-metallic filler material sheet may be a composite material, such as CFRP and GFRP. In block 106a, a filler may be fabricated from the filler material sheet using the cutting tool provided in block 102a. It should be noted that a filler or multiple instances of the filler may be located in a single sheet of material. Additionally, multiple filler configurations may grouped in a single sheet of filler material and sequentially without interruption of the process to load material or to unload material and/or fillers.

Referring next to FIGS. 2-5A of the drawings, various cutting tool configurations for production of fillers according to the method of the disclosure are shown. For example and without limitation, the cutting tool configurations shown in FIGS. 2-5A may be implemented in block 110 of the flow diagram 100 which was heretofore described with respect to FIG. 1 and in the flow diagram 100a which was heretofore described with respect to FIG. 1A. Application of the cutting tool configurations may enable the unique gage reduction and complex surface generation via material removal capabilities of the non-metallic composite materials (such as GFRP and CFRP).

Figure 2:
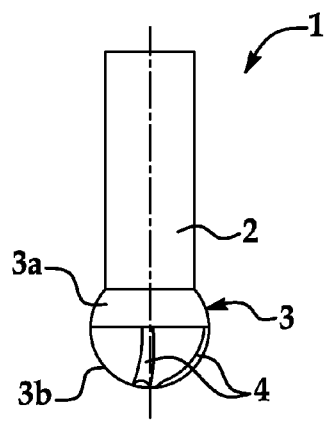
FIGS. 2 and 2A are side and end views, respectively, of a diamond abrasive cutting tool configuration which enables the unique gage reduction material removal capabilities of non-metallic composite materials in implementation of the automated filler production method.
Figure 2A:
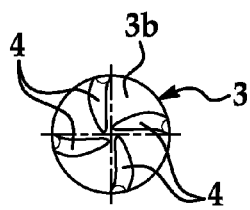

As illustrated in FIGS. 2 and 2A, in some embodiments the cutting tool 1 may include a generally elongated tool shank 2 having an attached material removal cutting head 3 on the tool shank 2. The attached material removal cutting head 3 may have a generally semispherical proximal head portion 3a and a generally semispherical cutting surface 3b which extends from the proximal head portion 3a. Diamond abrasive is applied on the material removal surfaces including grooves formed to facilitate the material removal process 4 may extend along the cutting surface 3b of the attached material removal cutting head 3. As shown in FIG. 2A, in some embodiments, the grooves formed to facilitate the material removal process 4 may be generally arranged in helical or straight patterns on the cutting surface 3b to facilitate the material removal process.

Figure 3:
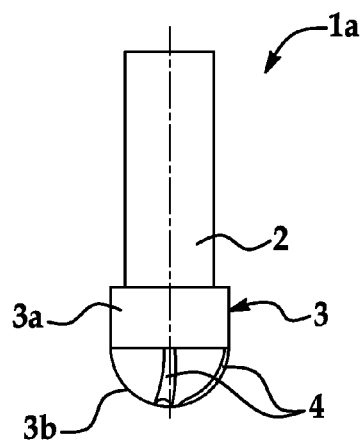
FIGS. 3 and 3A are side and end views, respectively, of an alternative diamond abrasive cutting tool configuration.
Figure 3A:
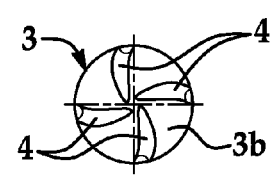

As shown in FIGS. 3 and 3A, in some embodiments the cutting tool 1a may include attached material removal cutting head 3 having a generally cylindrical proximal head portion 3a and a generally semispherical cutting surface 3b which extends from the proximal head portion 3a. The grooves formed to facilitate the material removal process 4 may extend along the cutting surface 3b of the attached material removal cutting head 3.

Figure 4:
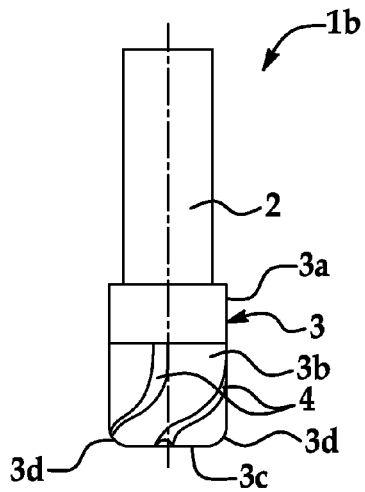
FIGS. 4 and 4A are side and end views, respectively, of another alternative diamond abrasive cutting tool configuration.
Figure 4A:
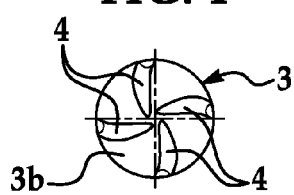

As shown in FIGS. 4 and 4A, in some embodiments, the attached material removal cutting head 3 of the cutting tool 1b may include a generally cylindrical proximal head portion 3a and a generally cylindrical side cutting surface 3b with a generally planar end cutting surface 3c. An annular cutting surface to facilitate the material removal process and to enable the generation of complex surfaces 3d which may be curved in cross-section and may circumscribe the end cutting surface 3c. Diamond abrasive coated grooves formed to facilitate the material removal process 4 may extend along the side cutting surface 3b, the radiused cutting surface edge 3d and the end cutting surface 3c.

Figure 5:
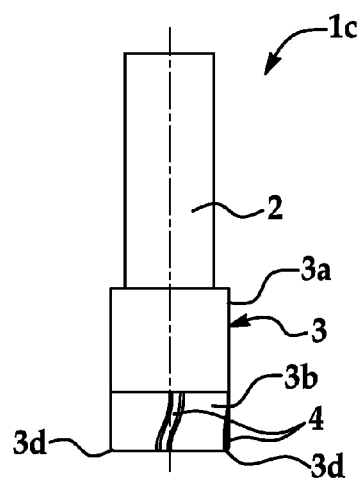
FIGS. 5 and 5A are side and end views, respectively, of still another alternative diamond abrasive cutting tool configuration.
Figure 5A:
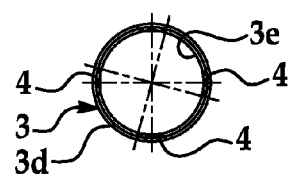

As shown in FIGS. 5 and 5A, in some embodiments the attached material removal cutting head 3 of the cutting tool 1c may include a generally cylindrical proximal head portion 3a and a generally cylindrical side cutting surface 3b with an annular cutting surface edge 3d. As shown in FIG. 5A, the material removal cutting head 3 may have a cutting surface bore 3e to facilitate material removal. Diamond abrasive cutting ridges 4 may extend along the side cutting surface 3b and onto the cutting surface edge 3d of the material removal cutting head 3 and into the area defined by 3e.

Figure 6:
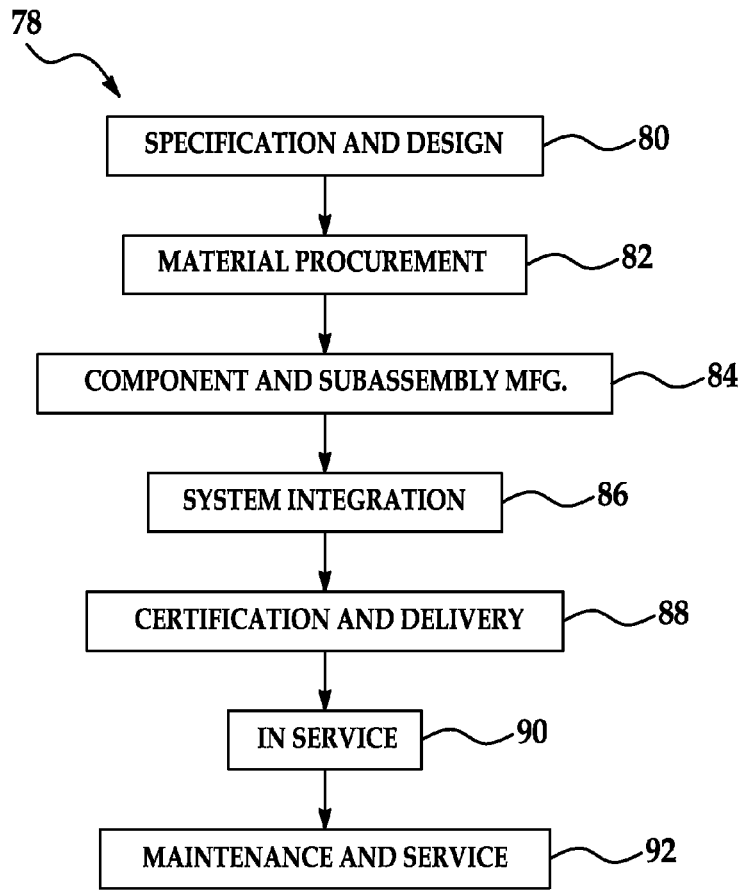
FIG. 6 is a flow diagram of an aircraft production and service methodology.
Figure 7:
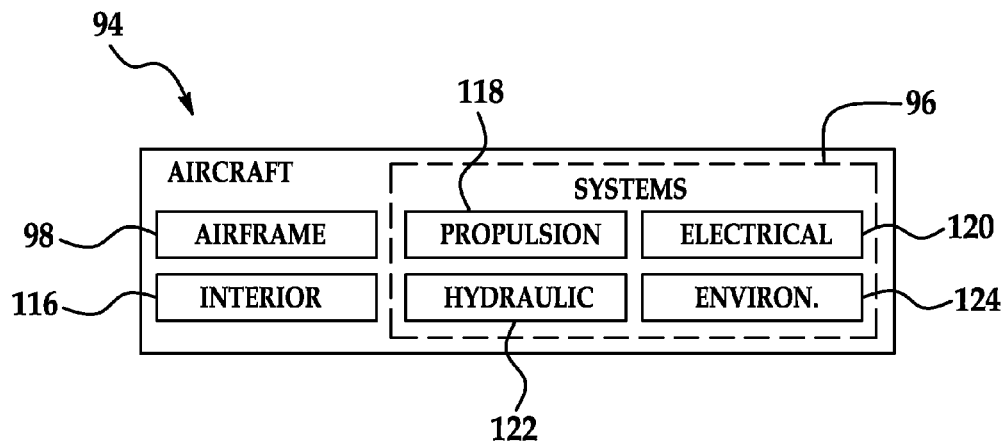
FIG. 7 is a block diagram of an aircraft.

Referring next to FIGS. 6 and 7, embodiments of the disclosure may be used in the context of an aircraft manufacturing and service method 78 as shown in FIG. 6 and an aircraft 94 as shown in FIG. 7. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 may be scheduled for routine maintenance and service 92 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 7, the aircraft 94 produced by exemplary method 78 may include an airframe 98 with a plurality of systems 96 and an interior 116. Examples of high-level systems 96 include one or more of a propulsion system 118, an electrical system 120, a hydraulic system 122, and an environmental system 124. Any number of other systems may be included. The assembly and/or installation requires filler to assure proper assembly and installation procedure as defined by the product design criteria. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although the embodiments of this disclosure have been described with respect to certain exemplary embodiments, it is to be understood that the specific embodiments are for purposes of illustration and not limitation, as other variations will occur to those of skill in the art.

What is claimed is:

1. An automated filler production method, comprising:
   obtaining gap measurement data by measuring a gap between component parts of a structure;
   capturing and providing said gap measurement data to a data collector function via at least one of a network communication to the data collector function, manual data entry in the data collector function, or delivery of a gap measurement file generated by computer based measurement systems;
   updating a computer aided design (CAD) system based solid model of the structure and a solid model definition of the filler with the gap measurement data;
   updating a computer aided manufacturing (CAM) process file with the updated filler solid model definition;

creating portable Machine Control Data (MCD) using the CAM process file and the updated filler solid model definition;
generating a machine set-up sheet specifying a material type, a part name, and a sheet thickness based on the filler solid model and design specifications;
providing the MCD to a filler machining center; and
machining a filler from a sheet of specified filler material using the MCD and the machine set-up sheet.

2. The method of claim 1 wherein measuring the gap between component parts of the structure comprises measuring a gap between component parts of an aircraft.

3. The method of claim 1 wherein delivering the gap measurement data to the data collector function comprises delivering the gap measurement data to the data collector function via a wireless local area network or a wired local area network.

4. The method of claim 1 further comprising generating an update of a numerical control program for a filler machining process using the gap measurement data.

5. The method of claim 1 further comprising shifting machining of the filler within a material envelope to increase filler substrate utilization.

6. The method of claim 1 further comprising providing a status update of a filler machining process, the filler machining process comprising the machining the filler.

7. The method of claim 1 wherein machining the filler from the sheet of filler material using the MCD comprises machining the filler from a composite material filler sheet using the MCD.

8. The method of claim 1 wherein machining the filler from the sheet filler material using said MCD comprises machining the filler from a metallic or non-metallic material filler sheet using said MCD.

9. The method of claim 1 wherein the machining comprises using a cutting tool having a cutting head having diamond abrasive coated grooves.

10. A method as defined in claim 1, further comprising monitoring for receipt of the gap measurement file via a watcher function for a notification of requirements and a status update.

11. A method as defined in claim 1, further comprising:
updating a status of machining the filler; and
distributing the status.

* * * * *